Patented Sept. 27, 1932

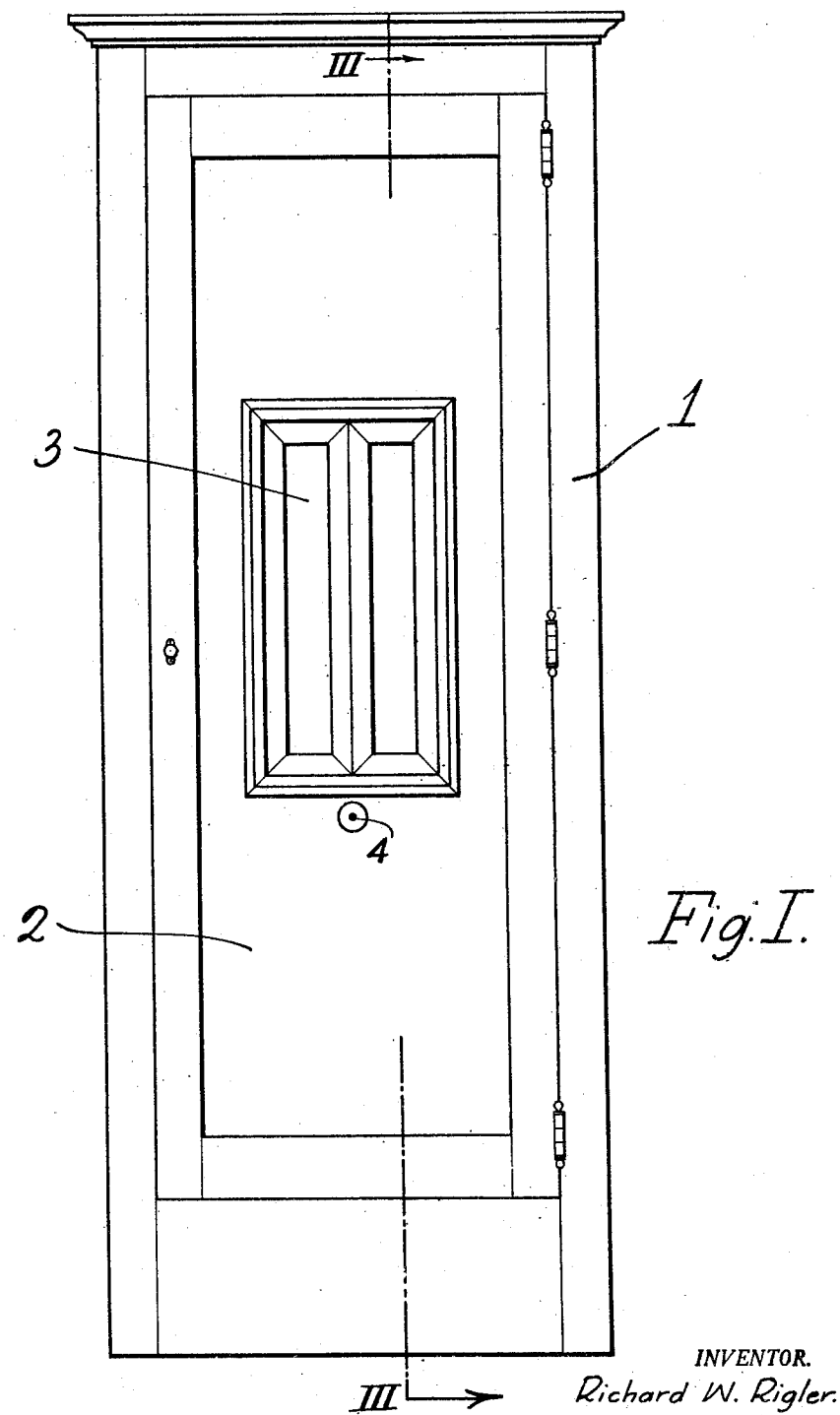
Fig. I.

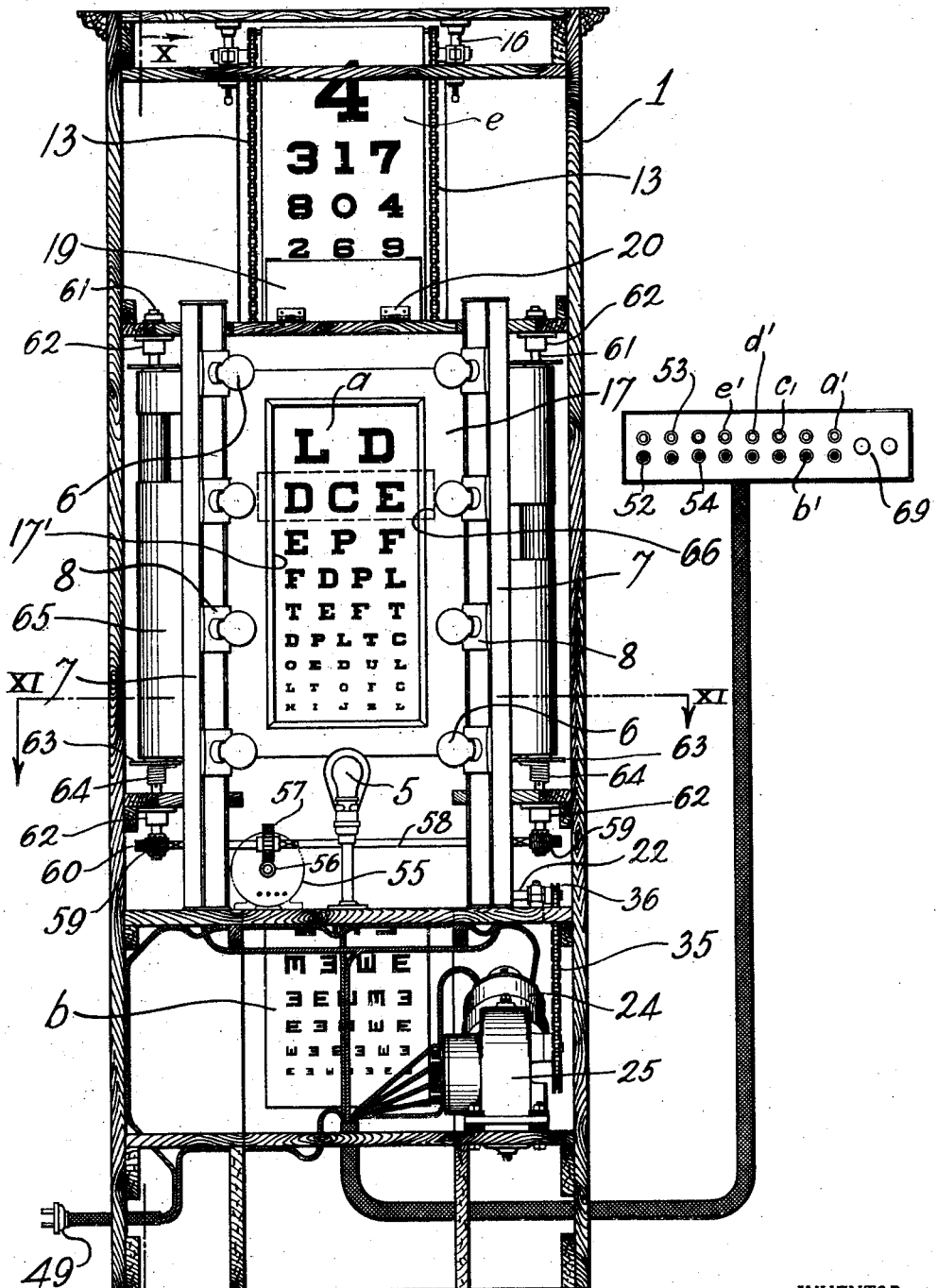
Fig. II.

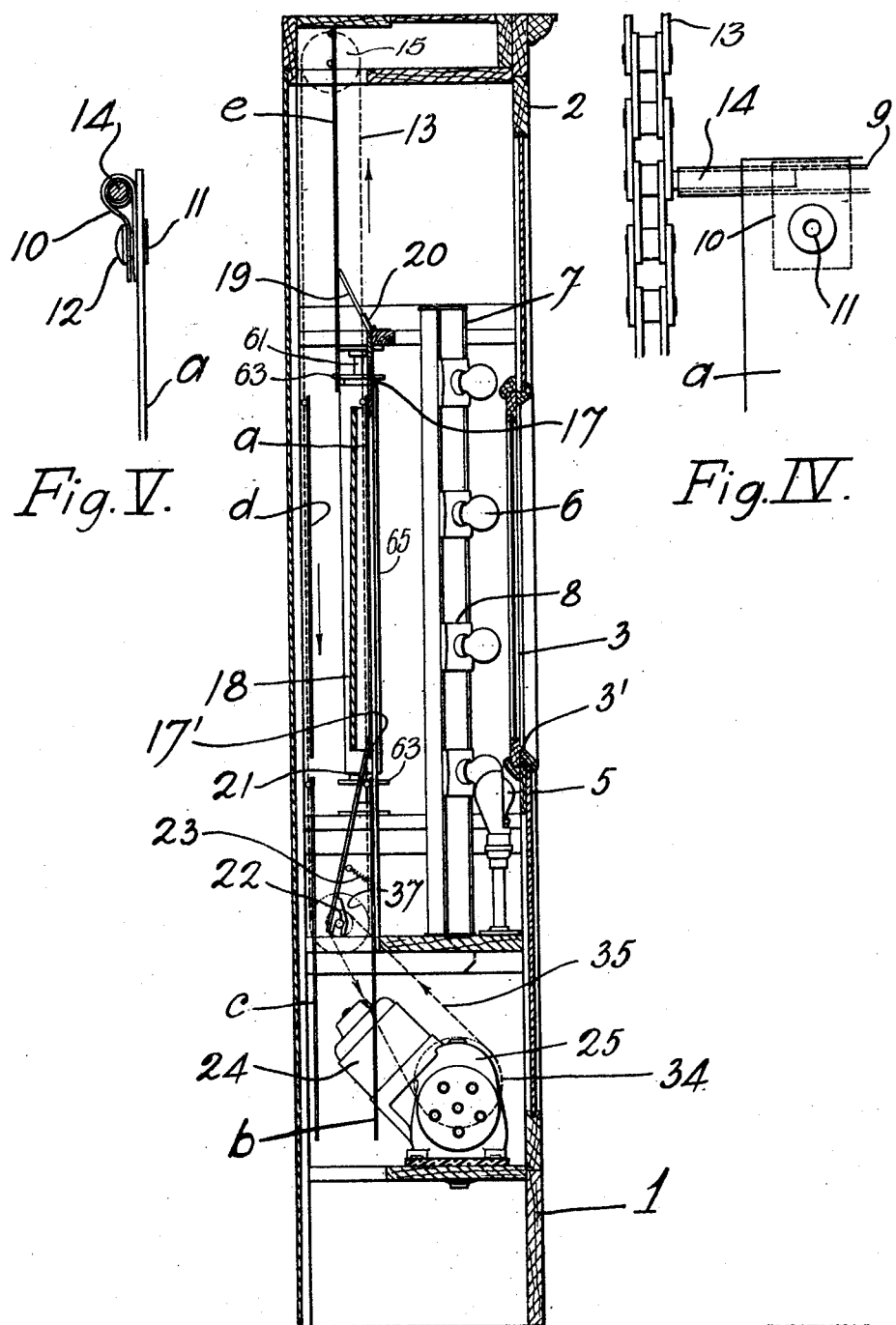

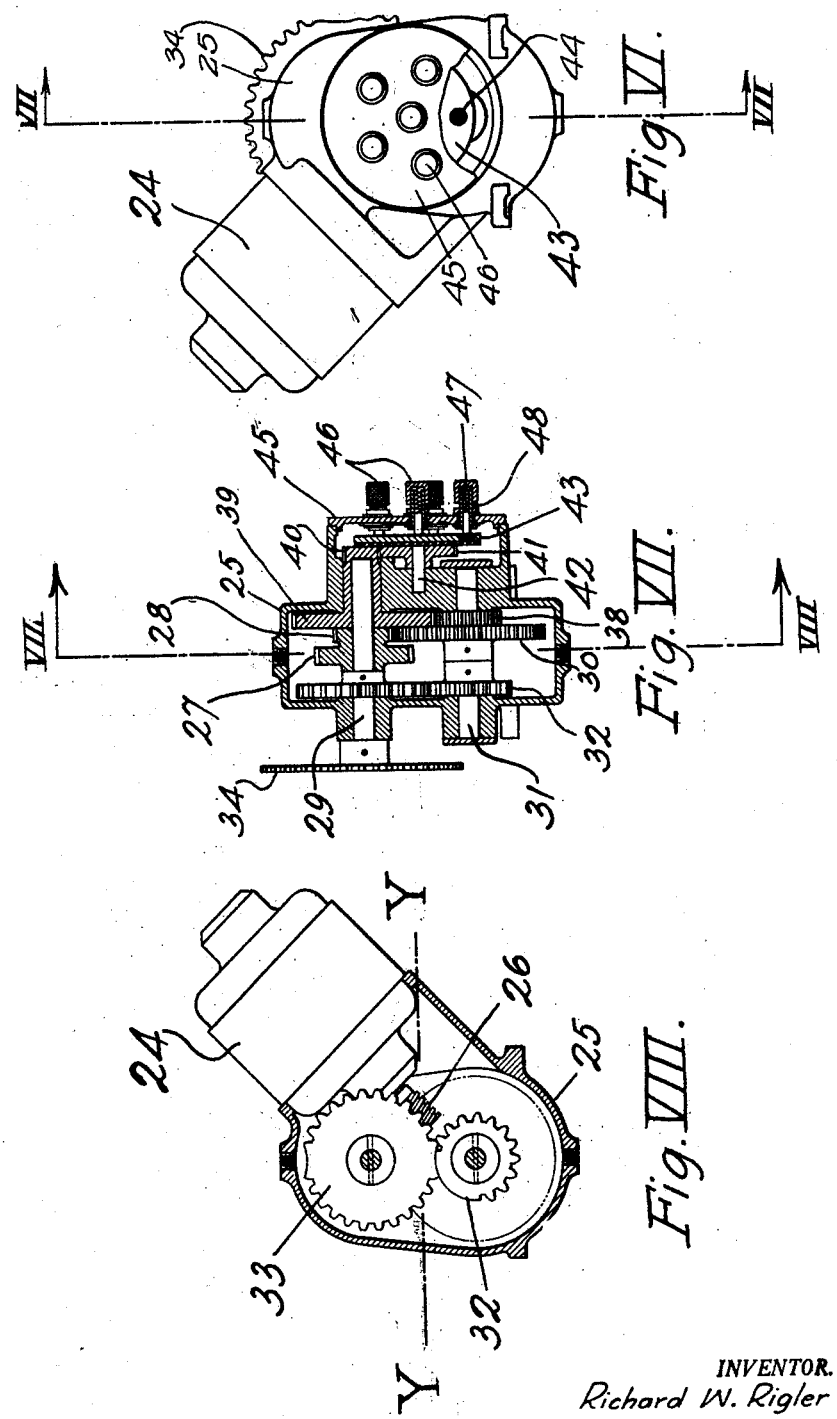

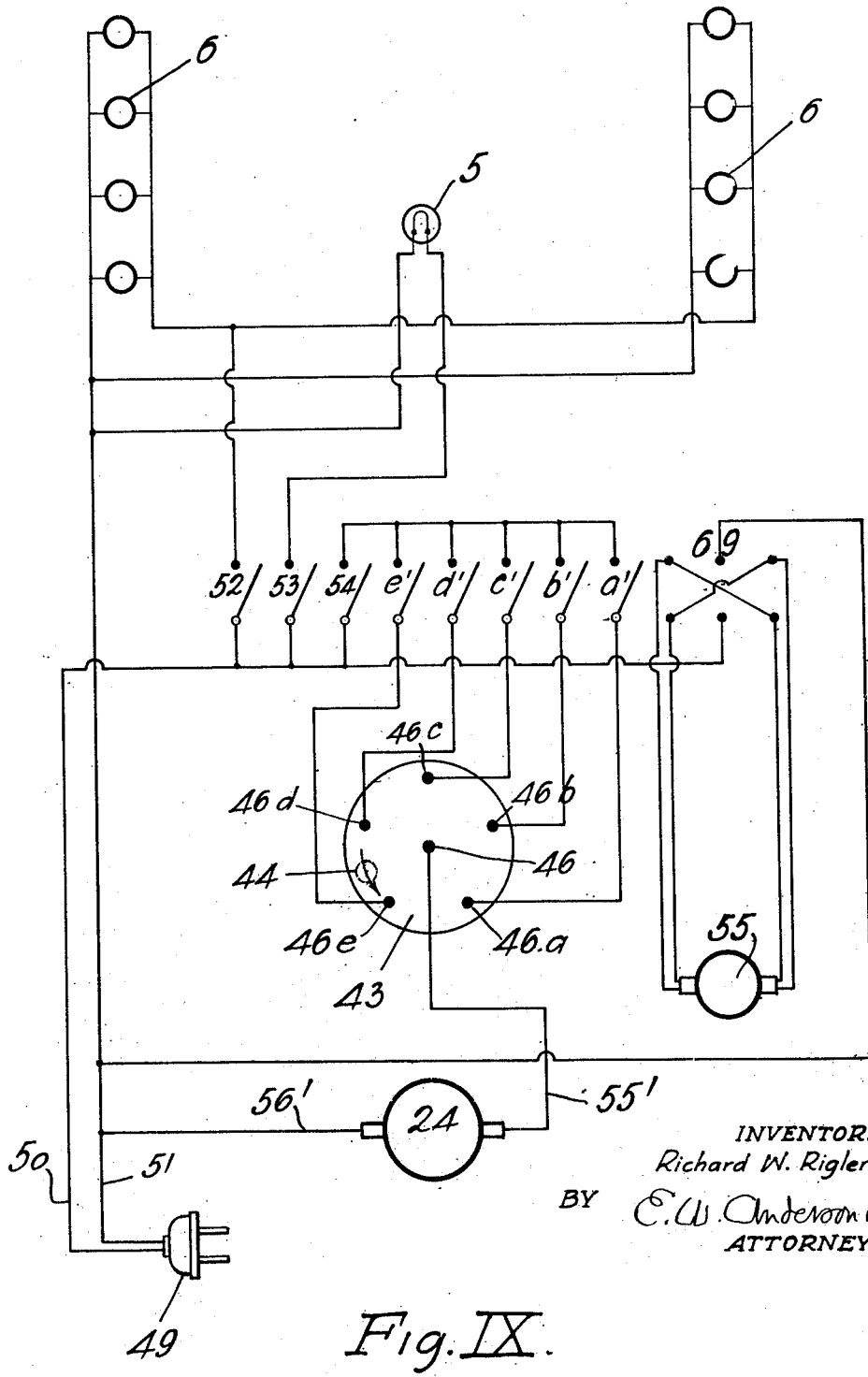
Fig. IX.

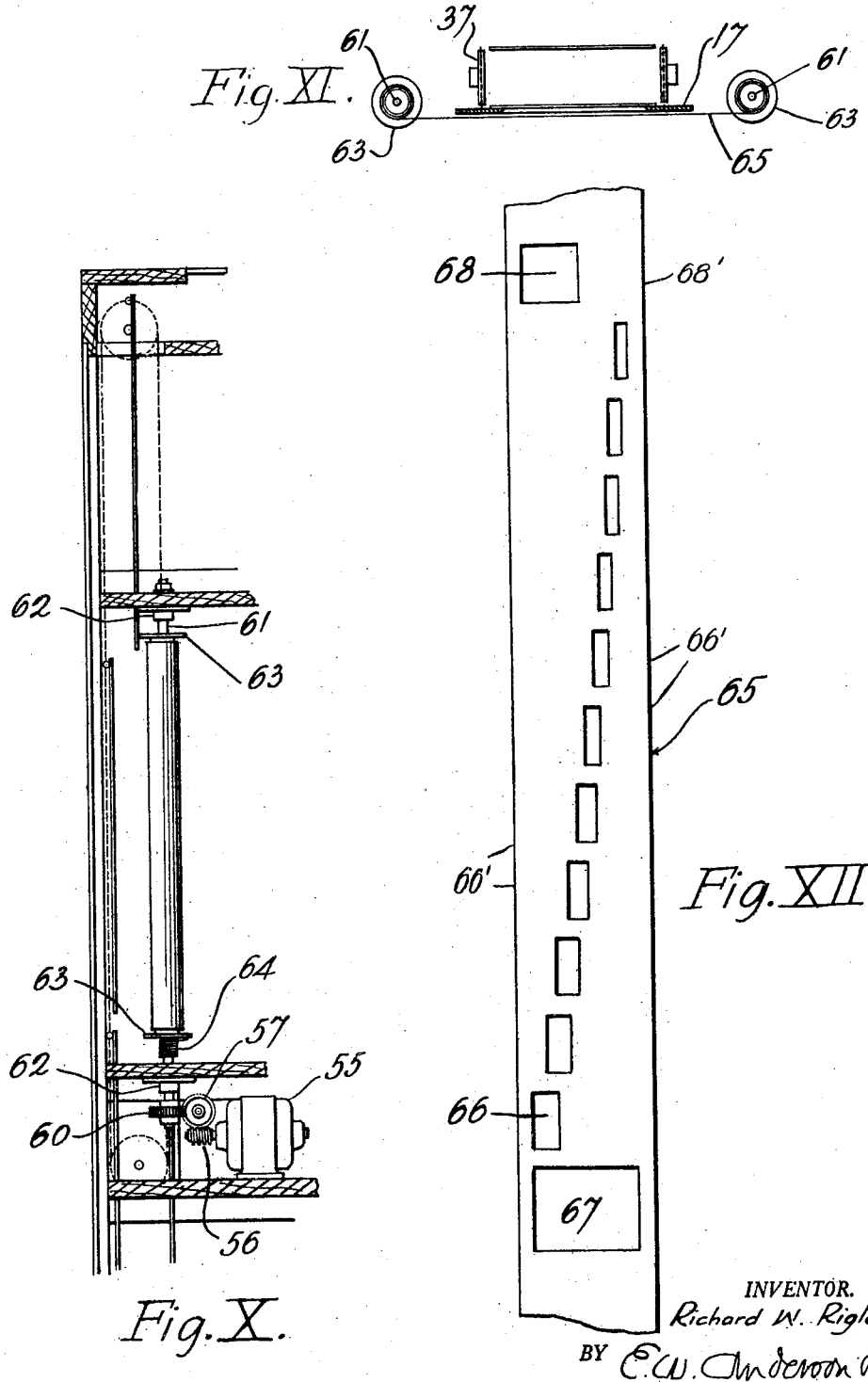

1,879,501

UNITED STATES PATENT OFFICE

RICHARD W. RIGLER, OF PHILADELPHIA, PENNSYLVANIA

APPARATUS FOR TESTING THE EYESIGHT

Application filed February 21, 1931. Serial No. 517,567.

The invention has relation to remote control apparatus for testing the eyesight, wherein a series of standard test cards are used, an object being to provide electrically controlled means operable at will to exhibit any one of said test cards as an entirety. Another object is to provide electrically controlled means operable at will to exhibit a line at a time or a selected portion of any of said test cards. Another object is to interchangeably exhibit any test card as an entirety or any individual line or a selected portion of any test card. Other objects and advantages will hereinafter appear.

The invention consists in the novel construction and combinations of parts as set forth in the appended claims.

In the accompanying drawings illustrating an embodiment of the invention:

Fig. I is a front view of the cabinet with the door closed.

Fig. II is a front view of the invention, showing the front of the cabinet removed.

Fig. III is a section on line III—III, Fig. I.

Fig. IV is a detail view of connection of a test card to its carrier chain.

Fig. V is a side view of the same.

Fig. VI is a detail side view of the motor attached to the transmission case.

Fig. VII is a section on line VII—VII, Fig. VI.

Fig. VIII is a section on line VIII—VIII, Fig. VII with the motor attached.

Fig. IX is a diagrammatic view of the electrical wiring.

Fig. X is a detail fragmentary front view of one side of the apparatus on line X—X of Fig. II with parts removed.

Fig. XI is a transverse horizontal section of the apparatus on line XI—XI of Fig. II with parts removed.

Fig. XII is a detail plan view of the apertured band.

In these drawings the numeral 1 designates a cabinet or inclosure having a hinged door 2 giving access to the entire interior, and about midway of its height sliding doors 3, normally covering a rectangular opening 3' through which the test card being exhibited is seen when the doors 3 are opened. Immediately below the opening 3' is a small opening or peep hole 4 through which the "muscle light" 5 to be described is seen, and having a power of about 15 watts.

On both sides and in front of the test card to be exhibited is a battery of eight 25 watt lamps 6, four on each side, arranged on an angle, and mounted on a partition 7, within porcelain sockets 8.

In the embodiment shown there are five test cards, a, b, c, d, and e, clamped upon transverse tubes 9 by means of straps 10 engaging said tubes, the test cards being attachable and detachable to and from said tubes by a separable fastener device 11 and 12 engaging the card and the strap of each card.

The sprocket chain device forming a common carrier for the test cards consists of a vertical sprocket chain 13 at each side of the cabinet, certain spaced links of said chains having opposite pins 14 pivotally engaging the hollow tubes 9 aforesaid, so that each test card is suspended from one end portion thereof to hang vertically.

Each sprocket chain engages a sprocket gear one directly above the other, the upper sprockets 15 being supported by adjustable bearings 16 for tensioning purposes.

While only five test cards are shown, it is obvious that any suitable number of cards may be used.

In front of the card a being exhibited, there is a panel board 17, provided with a rectangular opening 17' corresponding to the opening 3' and through which the card is viewed. Attached to the panel board 17 and spaced rearwardly thereof is another panel board 18, these two boards forming a vertical guideway for the forward stretch of the sprocket chain and the test cards carried thereby.

Means are provided to prevent the topmost test card which is passing around the upper sprockets from swinging to bring its lower end above the top end of a card being exhibited, to thereby block the movement of the test cards and of the sprocket chain. This means is shown as a pressure device or flap board 19, hinged at its lower end at 20 and having suitable springs to throw said board obliquely rearward.

The sprocket chain is stopped by means, to be described, to exhibit any one of the test cards through the window or sight opening 17' and in order that the card shall be caused to hang straight in case for instance it is warped, means are provided to press the lower free end of the card against the lower margin of the opening 17' against the board 17. This means is shown as a pressure device or flap board 21, hinged at its lower end upon shaft 22 of the lower sprocket and having a tension spring 23. This flap board 21 is oblique and extends at its lower end past shaft 22, thereby forming a deflector for any of the test cards which may swing pivotally forward at their lower ends over shaft 22, deflecting any such cards away from said shaft so that the card may pass downwardly in its proper path around shaft 22.

24 designates a standard electric motor set on an angle and attached to the transmission box or case 25, said motor also serving as a cover for the transmission box. On the lower end of the motor shaft is worm 26, driving worm wheel 27, attached and integral with spur pinion 28, wheel 27 and pinion 28 being loose on shaft 29, and pinion 28 meshing with spur wheel 30 fast to shaft 31.

Shaft 31 carries fast thereto the spur pinion 32, which is paired with spur wheel 33, these two gears forming intermittent gearing of which 32 is the driver and 33 is the driven member, the latter having two diametrically opposite stops and being fast to shaft 29. Sprocket 34 fast to shaft 29 drives sprocket chain 35 engaging sprocket 36 fast upon shaft 22, carrying two sprockets 37, being the lower sprockets of the chains 13.

Shaft 31 also carries fast thereto spur pinion 38, driving spur gear 39, the latter having a long hub extending through a bearing of the transmission case 25 and being loose upon shaft 29. At the other end of the hub of gear 39 is pinion 40, driving gear 41 loose on jack shaft 42.

Attached to the gear 41 but insulated therefrom is metallic plate 43, having near its circumference a non-conducting spot insertion 44.

Attached to the transmission case 25 and forming a stationary cover for one end thereof is a timing plate 45, fitted with five electrical contact brushes 46a, 46b, 46c, 46d and 46e, evenly spaced on a circle and another similar brush 46 in the center thereof, these brushes being of the carbon or other type. These brushes are all insulated from the timing plate 45 and are provided with compression springs 47 each in a hollow tube 48 to press the brushes in contact with the rotary metal plate 43.

These brushes are similar in number to the number of the test cards with an additional center brush for connection to the motor as explained later on.

Referring now to the wiring diagram, Fig. 9: 49 indicates an ordinary receptacle plug having two wires 50 and 51 attached, wire 50 leading to one end of each of switches 52, 53, 54, and 69, and wire 51 leading to motor 24, switch 69 and one side of the lights 5 and 6.

Switch 52 controls the circuit for the lights 6, and switch 53 controls the circuit for the "muscle" light 5. Each of the five outer brushes 46a, 46b, 46c, 46d, and 46e are located in the path of the non-conducting spot 44 and are connected to one pole of switches $a'$, $b'$, $c'$, $d'$, and $e'$, and the center brush 46 is connected to the motor 24. The other sides of switches $a'$, $b'$, $c'$, $d'$, and $e'$ are joined together and also to switch 54. Reversing switch 69 is connected to motor 55 with four wires to operate the motor in either direction.

*Operation*

Assuming that card $a$ is shown through the opening 17', Fig. 2, in which case the insulated spot 44 would be directly under brush 46a, timed accordingly by the combination of gear teeth, and it should be desired to have test card $e$ appear or be exhibited. First of all switch 54 must be closed and can be left so, except when placing new or other type cards in the machine, in which case this switch permits control to stop the cards in any convenient position to make the change from the front.

With switch 54 closed, and switch $a'$ closed also, all the operator has to do is to open switch $a'$ and close switch $e'$, which will immediately close the circuit, starting at plug 49 through wire 50 to switch 54, through switch $e'$, to brush 46e, through plate 43 to center brush 46, through wire 55' to motor 24, and wires 56' and 51 back to plug 49, thereby starting the motor to operate the entire mechanism, timed so that when the insulated spot 44 contacts with brush 46b, card $b$ is exhibited at the opening 17', and when contacting with brush 46c, card $c$ is exhibited and so on until the insulated spot 44 contacts with brush 46e, thereby breaking the circuit and stopping the motor with the desired card $e$ in proper exhibiting position. Taking another case, should card $b$ be wanted, it is only necessary to open switch $e'$ and close switch $b'$.

For every half rotation of the intermittent gear member 33 a different test card appears at the sight opening and is held momentarily in position by the stops in contact with the blank space on the driver member 32. This blank space permits the driver member 32 some excess movement to compensate for the energy stored up in the motor armature after the power is cut off.

The means for exhibiting a line at a time or a slided part of any test card will now be described.

55 designates an electric motor having reversible lead wires which permit rotation of the armature in either direction at will through wiring to a remote control. To the end of this motor shaft is secured a worm 56, meshing with worm wheel 57 mounted fast on horizontal shaft 58. On each end of shaft 58 is fast worm 59, right hand threaded worm on one end and left hand on the other end, these worms engaging and driving worm wheels 60 fast on the lower ends of vertical spindles 61 which are free to rotate in properly collared bearings 62. Loose on these spindles are flanged rollers 63, the lower flanges of which are connected to spindles 61 by helical springs 64, right hand twist on one side and left hand twist on the other. Obviously other types of springs may be used.

Wound around the rollers 63 is a flexible web or band 65, wherein are provided a plurality of openings 66, one for each line of a test card, these openings being staggered on said band, and the latter having portions 66' transversely opposite the openings and adapted to block off all the other lines of the card excepting the single line exhibited through one of said openings. Eleven openings 66 are shown in the band and nine superposed lines are shown on a test card $a$ in view Fig. II, but the number of lines on the cards may vary within certain limits. At one end of the band is shown an opening 67 to exhibit the entire test card and at the other end an opening 68 adapted to exhibit a plurality of lines of the test card and to block out through opposite solid portion 68' the balance of the lines.

The flexible band 65 is attached at each end to a roller 63 and the band will be wound upon one or the other of said rollers depending upon which roller is rotated through operation of the motor. The band having the aforesaid openings travels transversely of the machine and of the test card, in front of the test card, operation of the motor being started by closing the electrical circuit through pressing one of the push buttons of switch 69 to start the motor and band in the desired direction and when the desired line of the test card is exhibited the operator releases this push button, opens the circuit and stops the motor. The motor 55 having reversible lead wires may be operated in either direction, that is to say, when the band is wound up on one roller, the rotation of the motor may be reversed to wind up the band on the other roller.

Each opening 66 is made long enough to take care of any movement of the band after the current is stopped, due to energy stored up by the speed of the armature etc. The springs 64 are wound to oppose each other, thereby maintaining a uniform tension of the band. These springs also afford compensation for differential turns due to more turns on one roller than the other varying the diameters.

Obviously suitable means may be provided to automatically stop the motor when the band is completely rolled up on one of the rollers. Or one or both ends of the band may be colored so as to attract the attention of the operator when the band is near the end of its winding on one roller or the other.

The transmission case is intended to be filled with heavy lubricant up to a certain level as Y—Y, which will last indefinitely and muffle gear noises. Pads of rubber are used under the base of the transmission case, and the bolts are covered with rubber sleeves, the nuts having rubber washers thereunder, thereby rendering the machine practically noiseless, with the exception of the hum of the motor.

I claim:

1. In apparatus for testing the eyesight, a series of test cards having each a plurality of lines of characters, and means for interchangeably exhibiting any test card as an entirety or any individual line of any test card.

2. In apparatus for testing the eyesight, a series of test cards having each a plurality of lines of characters, and means for interchangeably exhibiting any test card as an entirety or a selected portion of any test card.

3. In apparatus for testing the eyesight, a vertical sprocket chain device, a series of spaced test cards each suspended at one end thereof from said chain device, an electric motor having driving connection with said chain device, means selectively operable at will to close the circuit through said motor to move said chain device and automatically operable to open said circuit and stop the motor to exhibit any one of said test cards, a vertical guideway for the test card being exhibited having a window opening, and means to move the lower free end of the test card leaving said guideway away from the card in the guideway to prevent blocking engagement of the cards.

4. In apparatus for testing the eyesight, a vertical sprocket chain device, a series of spaced test cards each suspended at one end thereof from said chain device, an electric motor having driving connection with said chain device, means selectively operable at will to close the circuit through said motor and move said chain device and automatically operable to open said circuit and stop the motor to exhibit any one of said test cards, a vertical guideway for the test cards as exhibited having a window opening, and means for pressing the free end portion of the card in the guideway against the margin of the window opening and thereby causing it to hang straight.

5. In apparatus for testing the eyesight, a vertical sprocket chain device, a series of spaced test cards each suspended at one end thereof from said chain device, an electric motor having driving connection with said chain device, means selectively operable at will to close the circuit through said motor and move said chain device and automatically operable to open said circuit and stop the motor to exhibit any one of said test cards, a vertical guideway for the test cards as exhibited having a window opening, and means to prevent blocking engagement of the test cards in the movement thereof.

6. In apparatus for testing the eyesight, a vertical sprocket chain device, a series of spaced test cards each suspended at one end thereof from said chain device, an electric motor having driving connection with said chain device, means selectively operable at will to close the circuit through said motor and move said chain device and automatically operable to open said circuit and stop the motor to exhibit any one of said test cards, a vertical guideway for the test cards as exhibited having a window opening, and means for pressing the cards as exhibited against the margin of the window opening to cause them to hang straight.

7. In apparatus for testing the eyesight, a vertical sprocket chain device, a series of spaced test cards each suspended at one end thereof from said chain device, an electric motor having driving connection with said chain device, means selectively operable at will to close the circuit through said motor and move said chain device and automatically operable to open said circuit and stop the motor to exhibit any one of said test cards, a vertical guideway for the cards as exhibited having a window opening, and means for pressing the cards as exhibited against the margin of said window opening to cause them to hang straight and for deflecting the lower ends of the cards successively back of and around the lower shaft of the sprocket chain device.

8. In apparatus for testing the eyesight, a series of standard test cards having each a varying number of spaced lines of various sized characters, a common carrier for said test cards, electrically controlled means operable at will to move said carrier and automatically operable to stop the same to exhibit any one of said test cards as an entirety, and means for exhibiting a line at a time of any one of said test cards.

9. In apparatus for testing the eyesight, a series of test cards having each a plurality of lines of characters, and means for interchangeably exhibiting any test card as an entirety or any individual line of any test card including a band having a plurality of openings staggered with relation to each other and solid portions opposite said openings to block out the lines not to be exhibited, said band having also an opening adapted to exhibit the entire test card.

10. In apparatus for testing the eyesight, a series of standard test cards having each a varying number of spaced lines of various size characters, a common carrier for said test cards, electrically controlled means operable at will to move said carrier and automatically operable to stop the same to exhibit any one of said test cards as an entirety, and means for exhibiting a line at a time of any one of said test cards including a transverse band in front of a test card, said band having openings staggered with relation to each other and solid portions opposite said openings to block out the lines not to be exhibited, said band having also an opening to exhibit the entire test card.

Signed at Philadelphia, in the county of Philadelphia and State of Pennsylvania this 19th day of February A. D. 1931.

RICHARD W. RIGLER.